(12) United States Patent
Haan et al.

(10) Patent No.: US 7,063,206 B2
(45) Date of Patent: Jun. 20, 2006

(54) ACCUMULATING CONVEYOR SYSTEM

(75) Inventors: Ted W. Haan, Wyoming, MI (US); Wynn M. Pelak, Rockford, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 112 days.

(21) Appl. No.: 10/605,277

(22) Filed: Sep. 19, 2003

(65) Prior Publication Data
US 2004/0112713 A1   Jun. 17, 2004

Related U.S. Application Data

(60) Provisional application No. 60/412,396, filed on Sep. 20, 2002.

(51) Int. Cl.
*B65G 13/06* (2006.01)
*B65G 43/00* (2006.01)
*B65G 47/26* (2006.01)
*B65G 47/31* (2006.01)
*B65G 43/10* (2006.01)

(52) U.S. Cl. .............. 198/781.05; 198/460.3; 198/462.1; 198/575

(58) Field of Classification Search ............. 198/460.3, 198/462.1, 575, 577, 781.03, 781.05, 781.06
See application file for complete search history.

(56) References Cited

U.S. PATENT DOCUMENTS

| | | | |
|---|---|---|---|
| 4,453,627 A | 6/1984 | Wilkins | 198/781 |
| 4,461,382 A | 7/1984 | Hoover et al. | 198/781 |
| 4,534,462 A | 8/1985 | Hoover et al. | 198/781 |
| 4,562,920 A | 1/1986 | Jaffre | 198/781 |
| 4,609,098 A | 9/1986 | Morgan et al. | 198/781 |
| 4,835,702 A | 5/1989 | Tanaka | 364/478 |
| 4,919,255 A | 4/1990 | Morgan et al. | 198/781 |
| 5,007,521 A | 4/1991 | Tanaka | 198/347.4 |
| 5,137,139 A | 8/1992 | Ruscello | 198/460 |
| 5,191,967 A | 3/1993 | Woltjer et al. | 198/781 |
| 5,358,097 A | 10/1994 | Bakkila et al. | 198/781 |
| 5,411,131 A | 5/1995 | Haegele | 198/572 |
| 5,429,225 A | 7/1995 | Schiesser et al. | 198/781.06 |

(Continued)

FOREIGN PATENT DOCUMENTS

EP     1228986 A1    8/2002

OTHER PUBLICATIONS

Commonly assigned co-pending U.S. Appl. No. 10/065,789, filed on Nov. 19, 2002, entitled High Volume Conveyor Sortation System.

*Primary Examiner*—Gene O. Crawford
(74) *Attorney, Agent, or Firm*—Van Dyke, Gardner, Linn & Burkhart, LLP

(57) ABSTRACT

An accumulation conveyor system and method of accumulating articles includes providing an accumulation assembly that is adapted to accumulating a plurality of articles into a slug of articles. Slugs of articles are discharged to a transport line which transports the slugs and accumulates the slugs as required. The accumulation assembly is made up of a slug forming section which forms slug portions and discharges slug portions into slugs. The accumulation assembly accumulates articles in zones and reduces gaps between articles in sequence from upstream gaps to downstream gaps.

39 Claims, 11 Drawing Sheets

U.S. PATENT DOCUMENTS

| | | | |
|---|---|---|---|
| 5,862,907 A * | 1/1999 | Taylor | 198/781.05 |
| 5,979,636 A | 11/1999 | Vanacore et al. | 198/460.1 |
| 6,378,694 B1 * | 4/2002 | Onoyama et al. | 198/781.06 |
| 6,460,683 B1 * | 10/2002 | Pfeiffer | 198/460.1 |
| 6,502,686 B1 | 1/2003 | Gorniak et al. | 198/347.4 |
| 6,540,063 B1 | 4/2003 | Fallas et al. | 198/461.1 |
| 6,729,463 B1 * | 5/2004 | Pfeiffer | 198/460.1 |

* cited by examiner

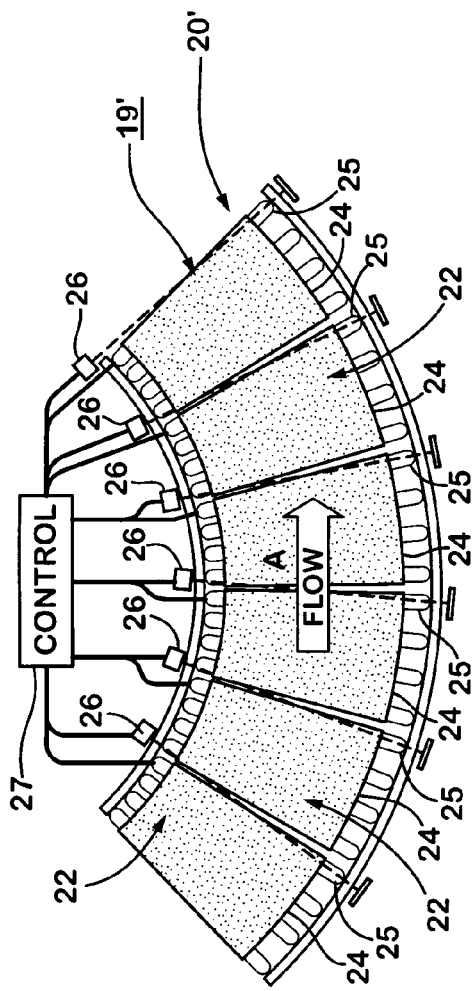
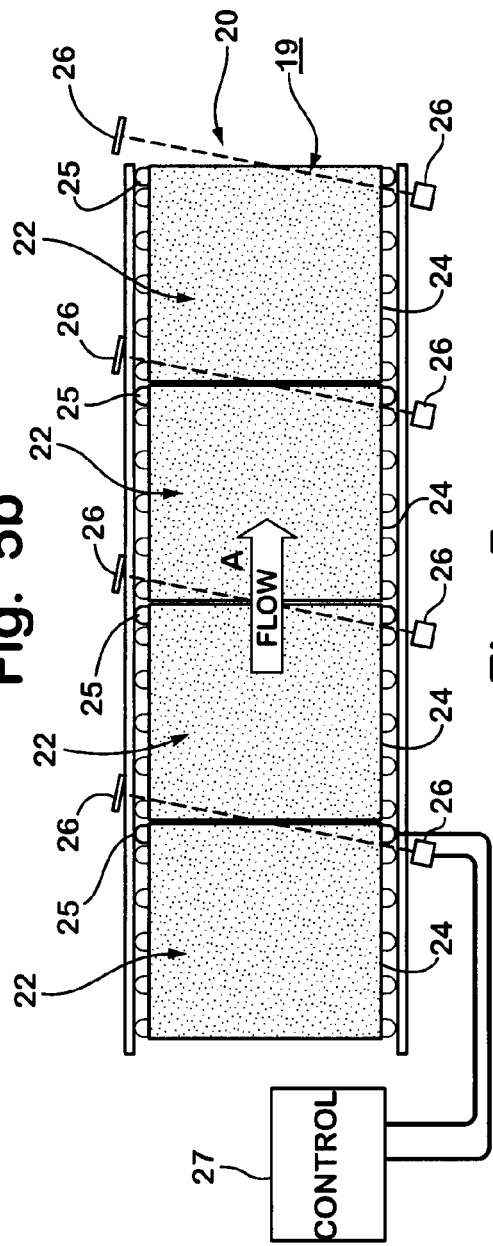

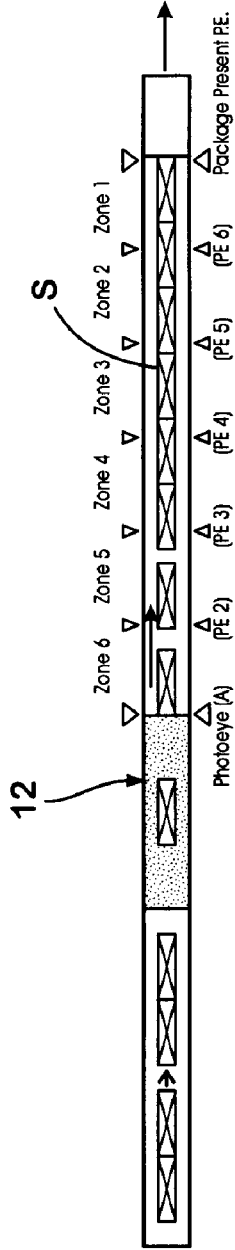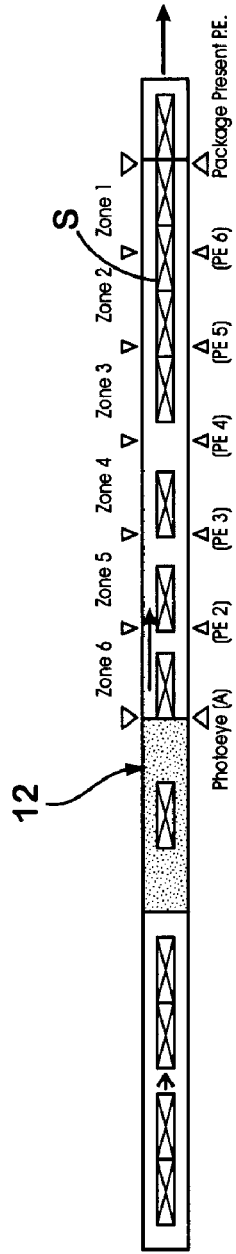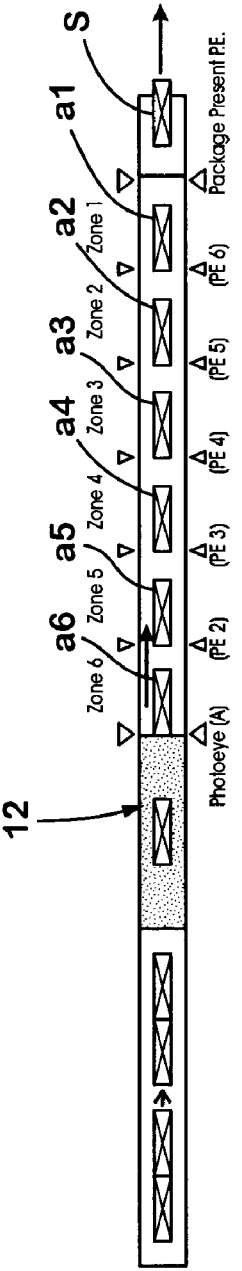

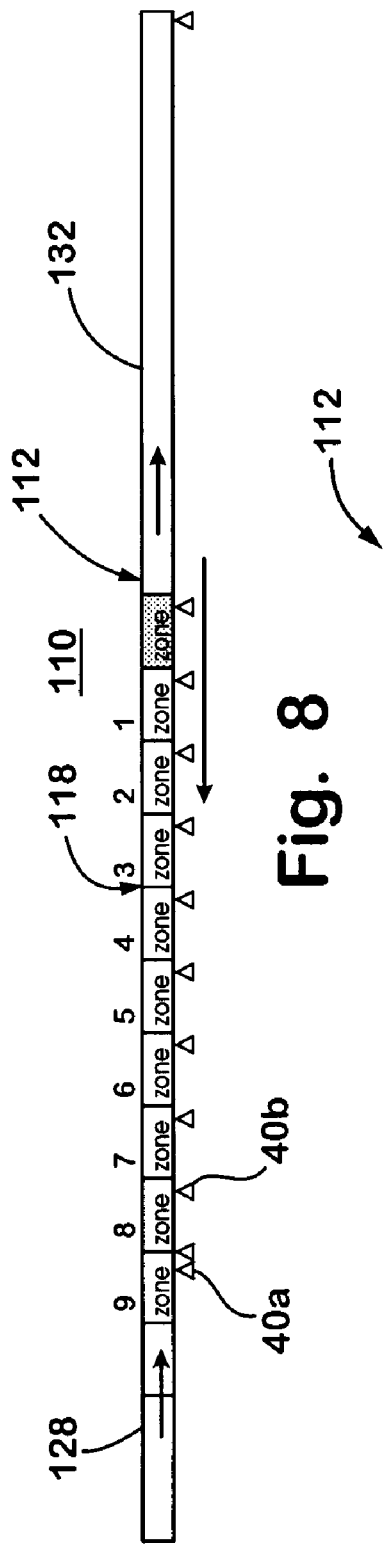
Fig. 8
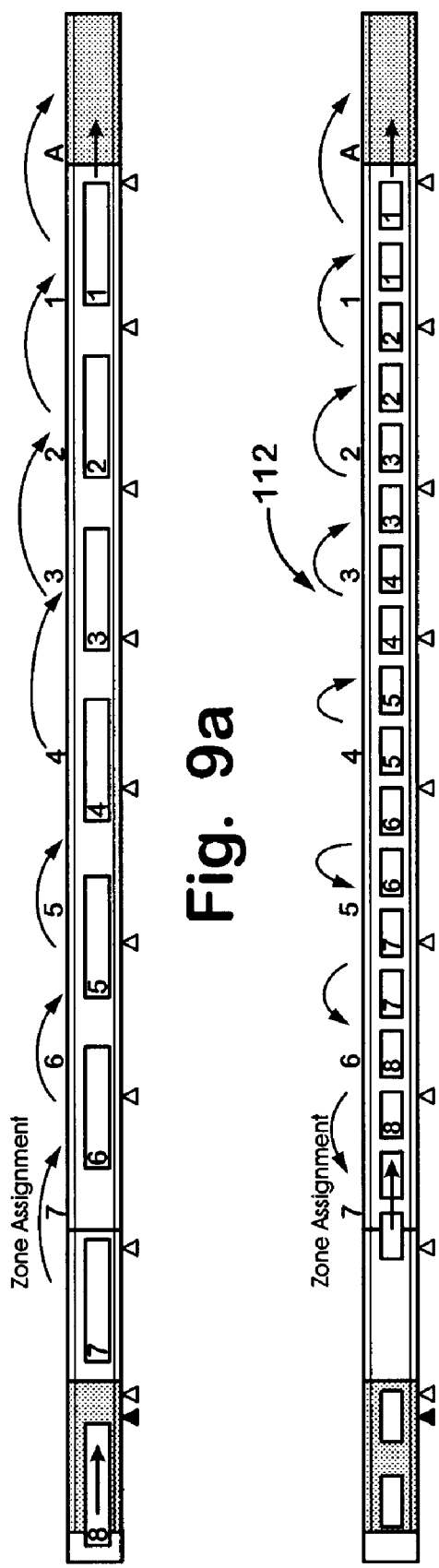
Fig. 9a
Fig. 9b

ACCUMULATING CONVEYOR SYSTEM

CROSS REFERENCE TO RELATED APPLICATIONS

This application claims priority from U.S. provisional patent application Ser. No. 60/412,396, filed on Sep. 20, 2002, the disclosure of which is hereby incorporated herein by reference in its entirety.

BACKGROUND OF INVENTION

The present invention pertains to an accumulation technique and a conveyor system utilizing the accumulation technique. The invention may be applied to an individual accumulation conveyor line or to a conveyor system made up of a plurality of accumulation conveyor lines having outputs merged at a merge assembly.

It is known to provide accumulation capability in conveyor systems in order to accommodate uneven throughput of articles in the system. For example, a conveyor system may receive articles on conveyor lines fed from loading doors in which trucks or other containers are discharged of articles at the loading doors. Some loading doors may be receiving articles, while others are not. Likewise, the conveyor system may be applied to a manual pick operation in which totes or other containers of articles are received along various conveyor lines at various intervals and are supplied to a downstream process. The rate of input of articles to the conveyor lines may be uneven. It is desirable to provide accumulation of articles along the conveyor lines. The conveyor lines may supply a merge assembly in order to combine the outputs of the conveyor lines prior to supplying articles to a downstream process, such as sortation system.

Two general types of accumulation conveyors are known. One type of accumulation conveyor accumulates articles behind a stop until the accumulation conveyor is full, at which time articles are discharges, in turn, to the merge assembly. The difficulty with this type of accumulation conveyor is that it produces line pressure on the upstream articles. The line pressure may be sufficient to dislodge articles from the line of articles, thereby causing side-by-side articles, which are difficult to sort. This is especially problematic for small articles being accumulated.

Another type of accumulation conveyor is a zero-line-pressure, or non-contact, accumulation conveyor. In such accumulation conveyor, the individual articles are accumulated individually in zones in order to avoid applying line pressure to downstream articles. While such zero-line-pressure accumulation conveyor avoids the difficulty of build-up of line pressure, it is common to have no more than one article per zone. Gaps are introduced between the articles during accumulation especially where a wide variety of article sizes are being handled by the conveyor system. The gaps reduce the throughput of the system because they reduce the number of articles that may be handled by each given length of conveyor at any given time.

Both of the known types of accumulation conveyors suffer from complexity and expense. To the extent that accumulation of articles is required, the entire length of the conveying line requiring accumulation is made up of an accumulation apparatus.

Accumulation conveyors have traditionally been pneumatically operated or a combination of electrically driven and pneumatically actuated systems. It would be desirable to overcome the high installed cost of such traditional accumulation conveyors and to overcome other difficulties associated with such traditional accumulation conveyors by utilizing an all-electrically operated system made up of motorized roller zone conveyors in the accumulation conveyor. This advantageously eliminates the need for supply of pneumatic source to the accumulation conveyor as well as provides other beneficial features to the accumulation conveyor. One difficulty with using motorized roller zone conveyors is that repeated cycling of the motorized roller on and off within a relatively short cycle time can result in the build-up of undesirable heat within the motorized roller. Therefore, it is desirable to reduce the number of times that a motorized roller-bases accumulation conveyor zone conveyor cycles on and off during an accumulation cycle.

SUMMARY OF INVENTION

An accumulation conveyor system and method of accumulating articles, according to an aspect of the invention, includes providing an accumulation assembly that is adapted to accumulating a plurality of articles into a slug of articles. The slug of articles has a nominal length. A transport line is provided that is made up of a plurality of tandem transport conveyors downstream of the accumulation assembly. A control is provided for the accumulation assembly and the transport lines. The control discharges individual slugs from the accumulation assembly and transports the slugs from the accumulation assembly with the transport conveyors. The control monitors slugs at the transport conveyors and accumulates slugs with the transport conveyors.

In one embodiment, the transport conveyors may have lengths that are substantially equal to the nominal length. The accumulation assembly may accumulate articles either with or without gaps between the articles. The control may accumulate slugs at the transport line from downstream transport conveyors to upstream transport conveyors. The transport conveyors may accumulate slugs at a first speed and discharge accumulated slugs at a second speed that is higher than the first speed.

The accumulation assembly may be made up of a plurality of conveying sections defining tandem accumulation zones. The control may operate the conveying sections to accumulate articles in the zones and form a slug by reducing gaps between the articles in sequence from upstream gaps to downstream gaps. The accumulation assembly may be made up of a slug forming section and a slug combining section. The slug forming section forms slug portions and discharges slug portions to the slug combining section. The slug combining section combines slug portions into slugs. At least two of the accumulating assemblies and respective transport lines may be combined with a merge for merging slugs from the transport lines and providing the slugs to a downstream process. The downstream process may be an article sortation process.

This aspect of the present invention provides an accumulation conveyor system and method of accumulating articles that may be implemented entirely by electrical components, such as electric motor operated belt conveyors. If desired, non-contact accumulation may be accomplished without injecting excessive gaps between the articles, thereby increasing the throughput of the system. This is especially advantageous in accumulating hard articles, such as totes, which could create noise by constant contact between the articles. The cost and complexity of the accumulation system is reduced because the accumulation of articles takes place at the front end of the system. The remaining portion of the system may consist of longer transport conveyor sections to transport the slugs formed at the accumulation assembly. This reduces the cost and complexity of the system.

An accumulation conveyor apparatus and method of accumulating articles, according to another aspect of the invention, includes providing a conveying surface divided into a plurality of conveying sections. The conveying sections define tandem accumulation zones. A control is provided that monitors articles on the conveying surface and operates the conveying sections to accumulated articles in the zones. The control operates the conveying sections with articles accumulated in the zones to form a slug by reducing gaps between the articles.

An accumulation conveyor apparatus and method of accumulating articles, according to another aspect of the invention, includes providing a conveying surface divided into a plurality of conveying sections. The conveying sections define tandem accumulation zones. A control is provided that monitors articles on the conveying surface and operates the conveying sections to accumulate articles in the zones. The control operates the conveying sections to form a slug by reducing gaps between articles in sequence from upstream gaps to downstream gaps.

The control may start and stop individual ones of the conveying sections no more than once during the accumulation cycle and may form the slug concurrently with discharging articles from the conveying surface. A slug combining section may be provided downstream in the conveying surface to combine slugs into larger slugs. A transport line may be provided made up of a plurality of tandem transport conveyors downstream of the accumulation assembly. The control discharges individual slugs from the accumulation assembly and transports the slugs from the transport conveyors. The control monitors slugs at transport conveyors and accumulates slugs with the transport conveyors.

An accumulation conveyor apparatus and method of accumulating articles, according to another aspect of the invention, includes providing a conveying surface divided into a plurality of conveying sections. The conveying sections define tandem accumulation zones. Article sensors are provided that are associated with the conveying sections and are positioned at interfaces of the conveying sections. A control is provided that monitors articles on the conveying surface and operates the conveying sections to accumulated articles in the zones by terminating operation of the conveying section when the associated article sensor senses a trailing portion of an article at that conveying section. The control operates the conveying sections with articles accumulated in the zones to form a slug by reducing gaps between articles.

The reverse-slug accumulation function allows accumulation in a manner in which it is both efficient and which allows for cycling on and off of each conveyor section only once during the accumulation of a slug. This, advantageously, allows motorized rollers to be utilized to operate the accumulation zones although other types of drives may also find benefit from these aspects of the invention.

These and other objects, advantages and features of this invention will become apparent upon review of the following specification in conjunction with the drawings.

BRIEF DESCRIPTION OF DRAWINGS

FIG. 5a is a top plan view of a conveying surface useful with the invention;

FIG. 5b is the same view as FIG. 5a of an alternative embodiment;

FIGS. 7a–7i are top plan views of the accumulation assembly in FIGS. 6a–6e illustrating the elimination of gaps while discharging articles;

FIG. 8 is the same view as FIG. 4 of an alternative embodiment; and

FIGS. 9a and 9b are the same view as FIG. 8 illustrating operation thereof.

DESCRIPTION OF THE PREFERRED EMBODIMENT

Figure 1:
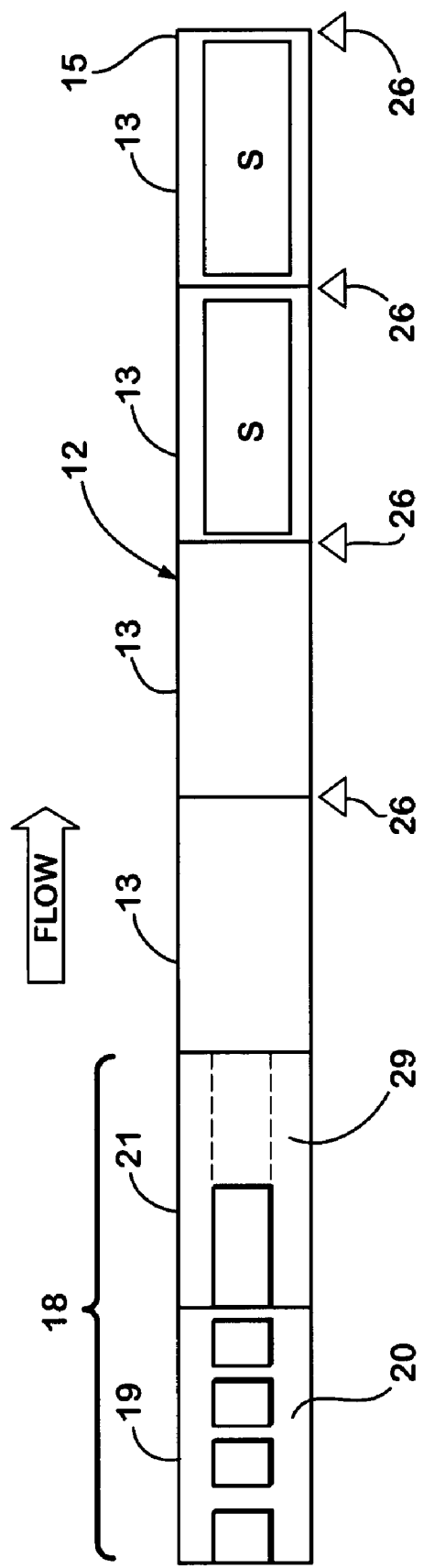
FIG. 1 is a top plan view of an accumulation conveyor system, according to an embodiment of the invention.
Figure 2:
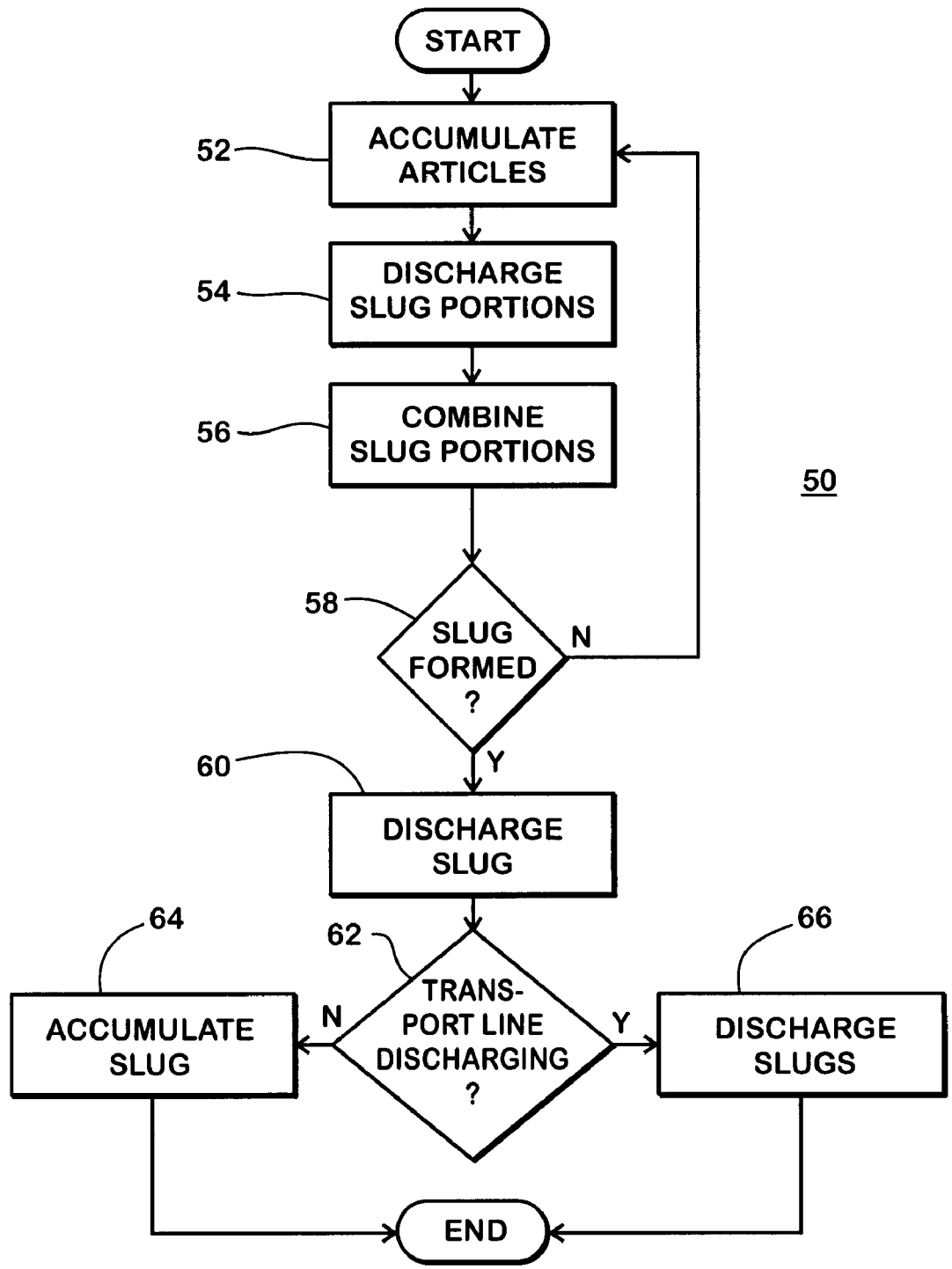
FIG. 2 is a flowchart of a method of accumulating articles, according to an embodiment of the invention.
Figure 3:
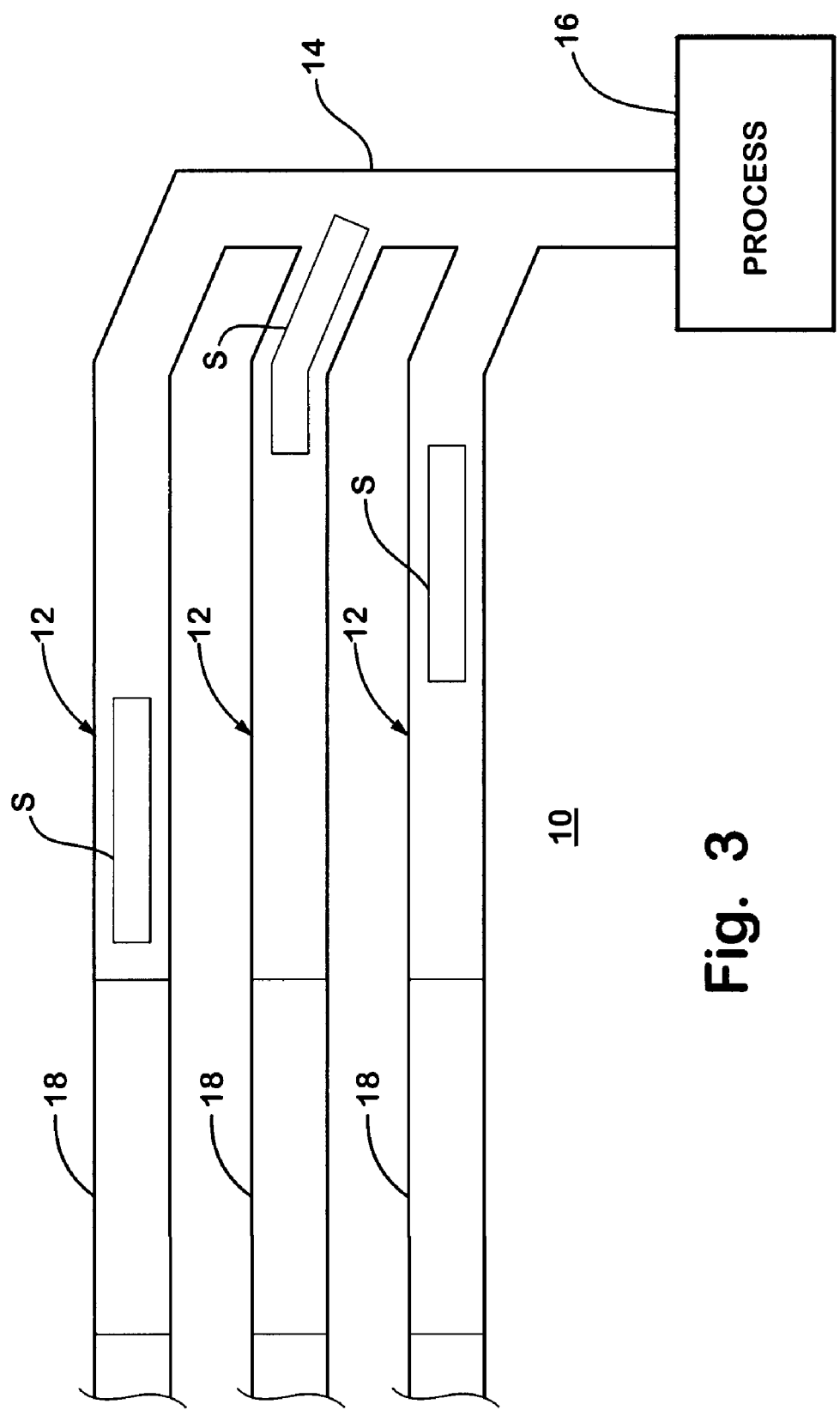
FIG. 3 is the same view as FIG. 1 showing a plurality of accumulation conveying lines merged.
Figure 4:
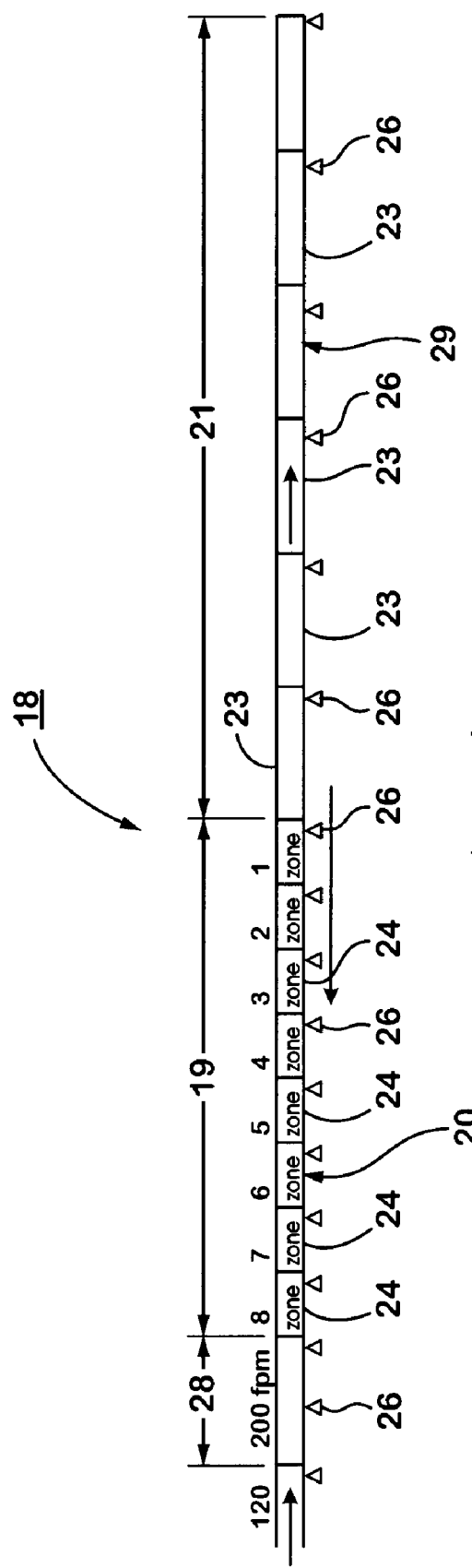
FIG. 4 is the same view as FIG. 1 illustrating details of an accumulation assembly.

Referring now to the drawings and the illustrative embodiments depicted therein, an accumulation conveyor system 10 includes an accumulation assembly 18 for accumulating articles into slugs and a transport line 12 for transporting slugs and accumulating slugs as required (FIG. 1). A plurality of such accumulation systems may be combined and merged with a merge 14, the output of which is supplied to a downstream process 16 (FIG. 3). The downstream process may be a sortation process, a palletizer, an automatic storage and retrieval system, a shipping function, or the like. Accumulation assembly 18 may be made up of a slug forming section 19 and a slug combining section 21. The slug forming section accumulates articles into slug portions. The slug combining section accumulates slug portions into larger slugs. The slugs are discharged from the slug combining section and transported by transport conveyors 13 of the transport line to a terminal end 15 of the line. At the terminal end of the line, the slugs may be accumulated or may be discharged. If the transport line is feeding a merge, then slugs may be accumulated while the transport line of other accumulation conveyor systems is discharging slugs.

A method 50 of accumulating articles begins at 52 by accumulating articles with slug forming section 19. As will be set forth in more detail below, the articles in the illustrative embodiment are accumulated with gaps between the articles. Articles are discharged at 54 from slug forming section 19 to slug combining section 21. In the illustrative embodiment, gaps are reduced from between the articles beginning from upstream gaps and progressing toward downstream gaps, as will be described in more detail below. The slug portions are combined at 56 with slug combining section 21. As illustrated in FIG. 1, slugs are accumulated with slug combining section 21 by moving a conveyor surface 29 thereof in order to accommodate the incoming slug portion. Thus, the slug "grows" from the upstream portion of the conveying surface 29 without substantial gaps between the slug portions. This provides a slug, which either has no gaps or controlled gaps between the articles.

After a slug portion is combined with a developing slug at 56, it is determined at 58 whether a complete slug has been formed with the slug combining section. If not, control returns to 52 for additional articles to be accumulated and the slug portion discharged at 54 and combined with the growing slug at 56 until an entire slug is formed. When it is determined at 58 that an entire slug has been formed, the slug is discharged at 62 to transport line 12 and transported sequentially by transport conveyors 13 to terminal end 15. Photo sensors 26 at the transport conveyors determine which transport conveyors have slugs accumulated thereon. The slugs accumulate from the transport conveyor adjacent terminal end 15 upstream to other transport conveyors in a sequential manner. It is then determined at 62 whether transport line 12 is to be discharged, such as receiving a discharge signal from a system control (not shown). If it is determined at 62 that the transport line is not discharging, slugs accumulate on the transport conveyors at 64, as previously described. If it is determined at 62 that the transport line is in a discharging mode, transport conveyors 13 are actuated to discharge slugs at 66. Because articles and slugs of articles are positively conveyed, such as with belt conveyors, throughout the accumulation conveyor system, gaps may be introduced, if desired, and maintained throughout the process. This not only avoids the build-up of line pressure, which can cause side-by-side articles as well as knocking of articles together, but also is capable of maintaining any gaps established between the articles throughout the accumulation process. Moreover, it is contemplated that transport conveyors 13 may be operated at a particular speed in order to accumulate slugs and operated at a second, higher speed in order to discharge the slugs of articles from terminal end 15, such as to merge 14, or the like.

Slug forming section 19, in the illustrative embodiment, is made up of a series of tandem zone conveyors 24, which, in the illustrative embodiment, are belt conveyors 22. The zones are numbered 1–8 for illustration purposes. The belt conveyors may be arranged in a straight line, as illustrated in FIG. 5*a* and as described in more detail in commonly assigned U.S. patent application Ser. No. 10/358,690, filed on Feb. 5, 2003, by David H. Cotter et al., for a BELT CONVEYOR, the disclosure of which is hereby incorporated herein by reference. Alternatively, the zones may be arranged in a turn, as illustrated in FIG. 5*b* and as described in commonly assigned U.S. patent application Ser. No. 10/411,757, filed on Apr. 11, 2003, by David H. Cotter et al., for a CURVED BELT CONVEYOR, the disclosure of which is hereby incorporated herein by reference. The conveyor zones define a conveying surface 20, which conveys articles from a gapping conveyor 28 through the slug forming section. The gapping conveyor introduces a gap between articles in order to allow articles to be individually measured and handled. In the illustrative embodiment, a 60 percent speedup is provided in order to provide significant separation between the articles. However, selection of degree speedup would be within the skill of the ordinary artisan and may vary with application. An object sensor 26 is provided between the interfaces between adjacent conveyor zones 24. In the illustrative embodiment, the photo eye is aimed at an angle in order to sense the leading edge of an article in the upstream zone and the trailing edge of an article in the downstream zone. Outputs of object sensors 26 are supplied to a control 27. Outputs of control 27 are supplied to motors operating the individual belt conveyors 22. As described in the previously referred to co-pending applications, such belt conveyors may advantageously be driven with a motorized roller. This provides for compact configuration. However, it should be understood that other drives may be utilized for the belt conveyors and other types of conveying surfaces, such as driven rollers, and the like, may be used for the zone conveyors. In the illustrated embodiment, zone conveyors 24 are illustrated at 0.5 meters in length of slug forming section 19, in the length. The build length of slug forming section 19, in the illustrative embodiment, is 3 meters.

Slug combining section 21 is made up of a series of tandem arranged slug handling conveyors 23 which make up a conveying surface 29. One or more object sensors 26 may be arranged along conveying line 29 in order to monitor slug portions being combined into a growing slug. In the illustrated embodiment, slug-handling conveyors 23 are 1 meter in length, but may be other lengths. Moreover, conveying surface 29 may be a single, longer conveyor extending the length of the slug combining section. The length of conveying surface 29 is intended to equal a nominal length of the slug being developed. In the illustrative embodiment, a 6-meter nominal length of the slug is utilized, although other lengths may be selected.

The length of each transport conveyor 13 is generally equal to the nominal length of each slug, which is the same length as conveying surface 29 of slug conveying surface 29 to a transport conveyor and accumulated on a single transport conveyor 13. However, transport conveyors could be shorter in length with a slug accumulated on more than one transport conveyor.

Accumulation assembly 18 further includes a feed conveyor, such as a gap-adjusting conveyor 28, upstream of conveying surface 20 which is supplied by articles, such as from a charge conveyor 30 (FIGS. 6*a*–7*i*). Gap-adjusting conveyor 28 provides a speed increase in order to ensure that a physical gap is present between the articles. The gap is in order to allow the leading and trailing region, namely an edge, of each article to be detected by photo-eyes 26. Gap-adjusting conveyor 28 may be operated in a start/stop fashion with a speed increase from charge conveyor 30 in order to ensure the presence of gaps between articles. Alternatively, gap-adjusting conveyor 28 may be made up of a plurality of meter belts, which are operated according to variable speeds in order to ensure gapping between the articles. In the illustrative embodiment, gap-adjusting conveyor 28 is a fixed ratio, such as 160 percent, of the speed of change conveyor 30.

Figure 6A:
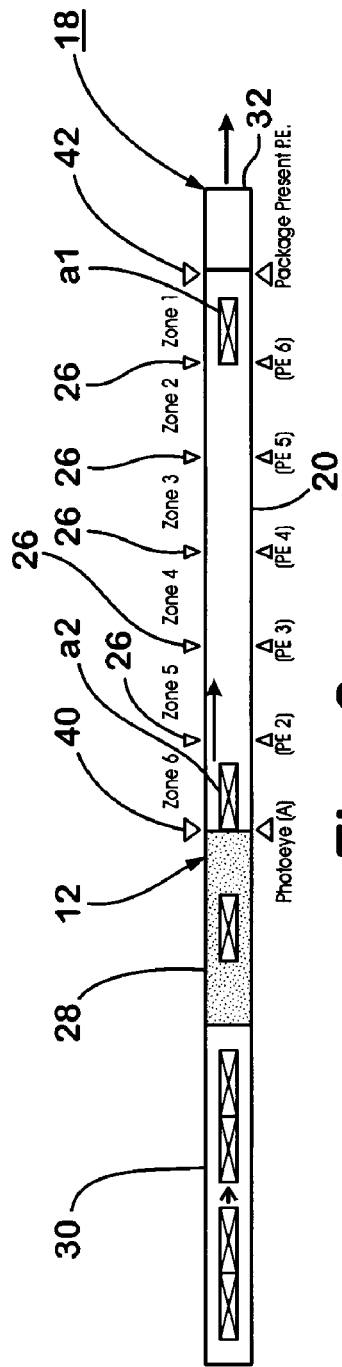
FIGS. 6a–6e are top plan views of an accumulation assembly illustrating accumulation of articles.
Figure 6B:
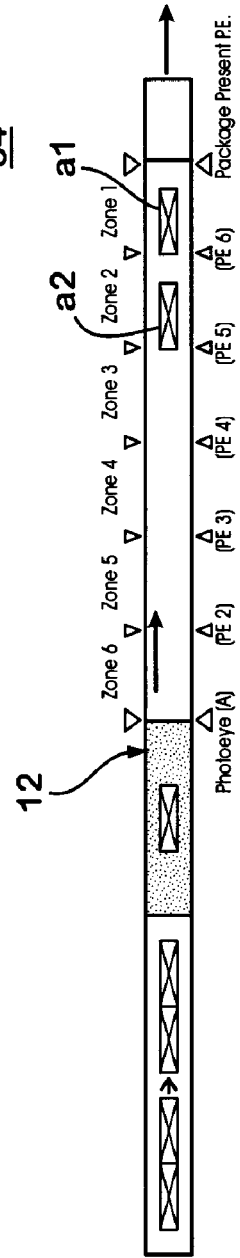
Figure 6C:
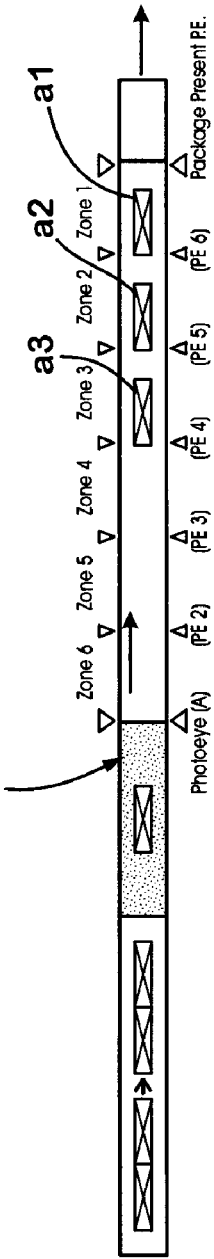
Figure 6D:
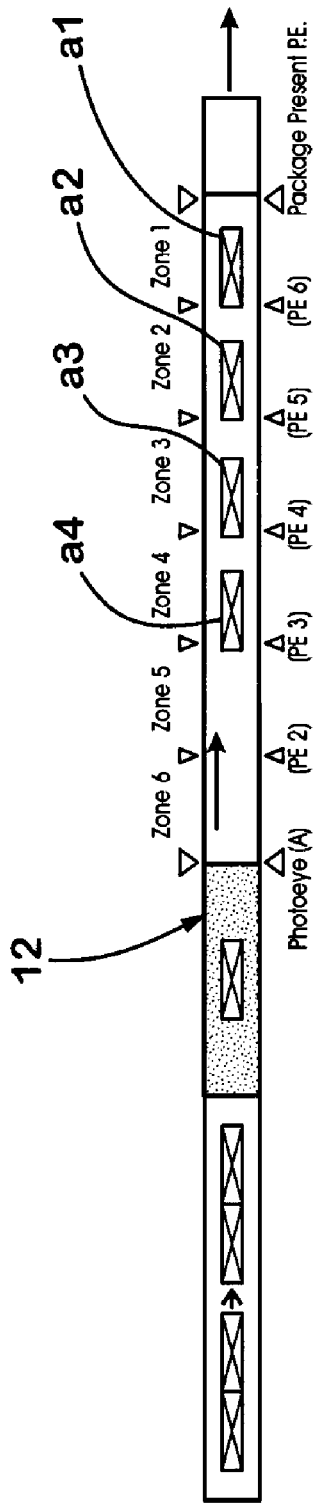
Figure 6E:
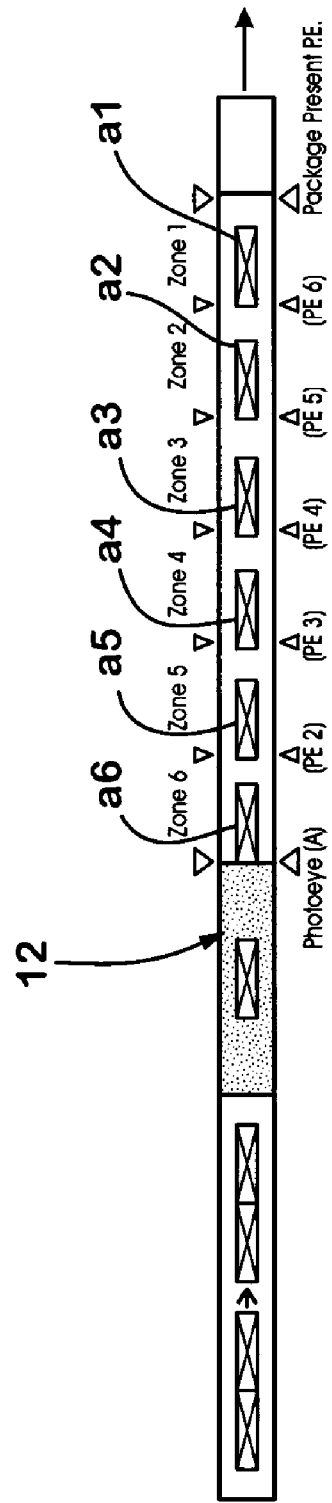

Slug forming section 19 of accumulation assembly 18 is operational in an accumulation mode 34 (FIGS. 6*a*–6*e*) and a discharge mode 36 (FIGS. 7*a*–7*i*). Accumulation mode 34 may begin with conveying surface 20 empty, as illustrated in FIG. 6*a*. With the conveying surface 20 empty, a first article A1 moves from gap-adjusting conveyor 28 and propelled by zone conveyors 24 which are operating continuously until article A1 reaches downstream zone 1, at which time the zone conveyor for zone 1 discontinues operation when it senses a trailing edge of article A1 by the photo-eye 26 at an upstream location of that zone. The zone conveyor for zone 1 may discontinue operation immediately upon sensing the trailing edge of article A1 or after a delay. A second article A2 moves from gap-adjusting conveyor 28 and transported by the zone conveyors upstream of zone 1 until article A2 reaches zone 2 and the trailing edge of article A2 is sensed by the photo-eye at an upstream portion of zone 2. The articles continue to accumulate in this fashion, as seen in FIGS. 6*c*–6*e*, with an article in each zone. A particularly long article that is longer than each zone conveyor may be accumulated in two or more zones within the principle of the present invention.

Figure 7A:
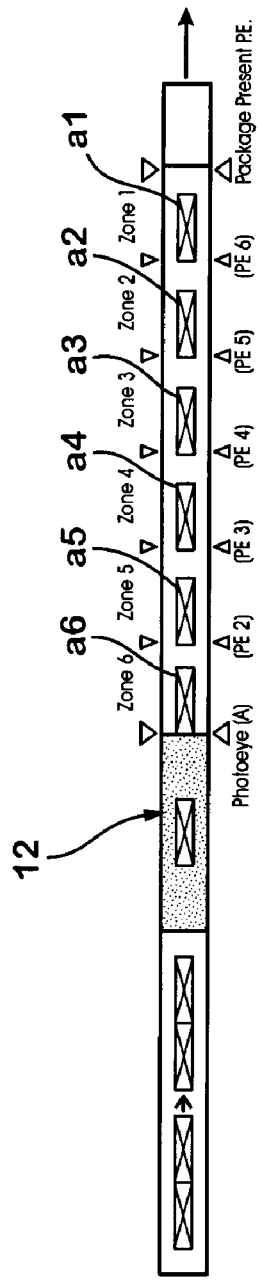
Figure 7B:
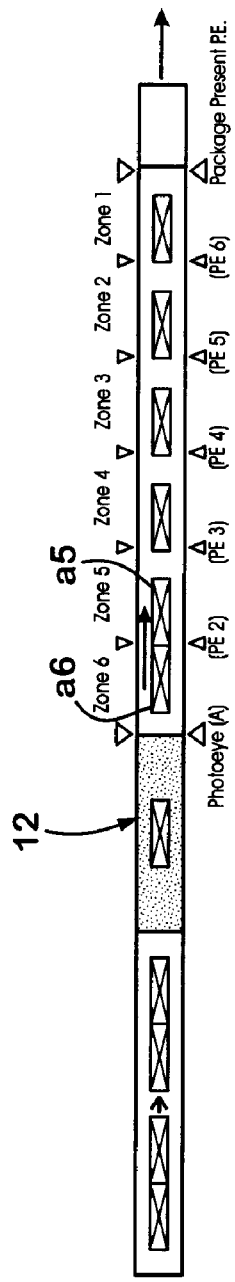
Figure 7C:
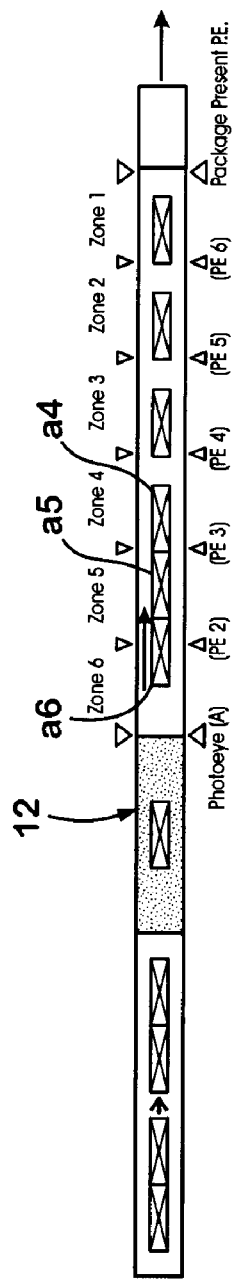
Figure 7D:
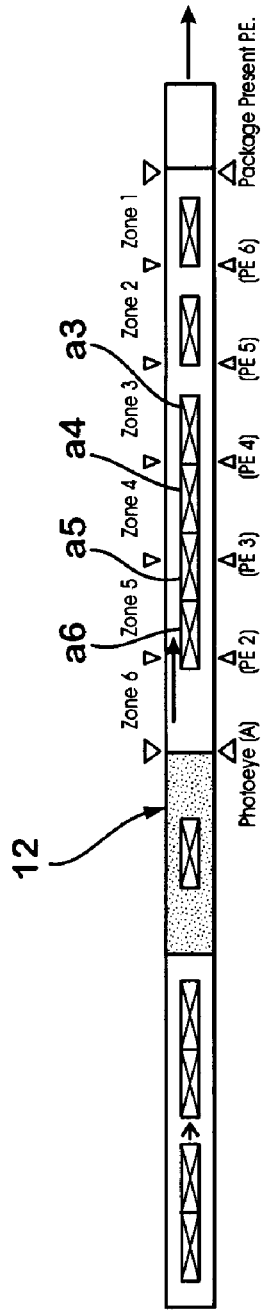
Figure 7E:
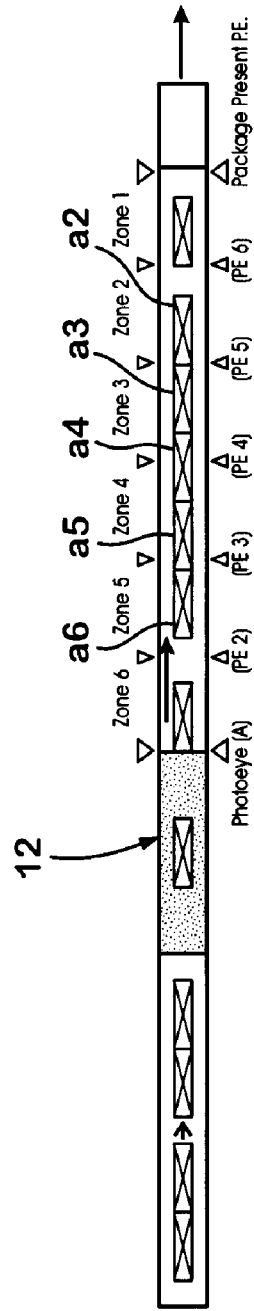
Figure 7F:
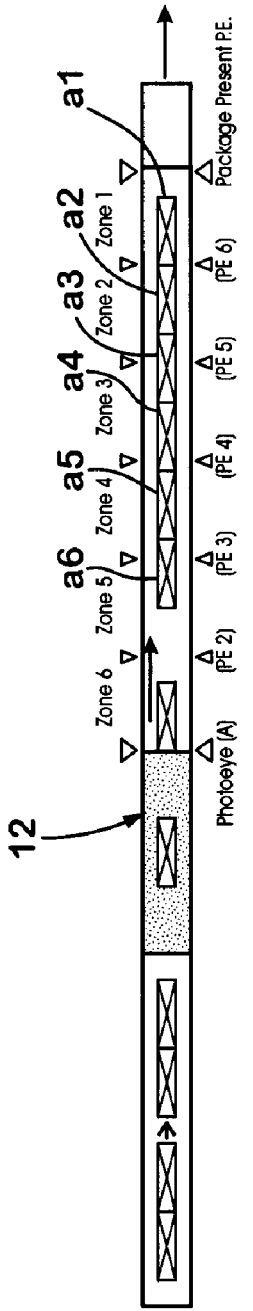

When all of the zones are full, as illustrated in FIG. 6*e*, the slug-forming portion of the accumulation assembly enters a discharge mode 36 (FIGS. 7*a*–7*i*). In the discharge mode 36, the zone conveyor 24 of zone 6 is operated until the leading edge of article A6 is detected by the photo-eye for zone 5. Either through a skewed orientation of the photo-eye, as illustrated in FIGS. 5a and 5b, or because of a delay built into the cycling off of a zone upon accumulating an article therein, or both, a controlled gap, which may be selected to be as small as desirable, may be provided between articles A5 and A6. As soon as the leading edge of article A6 is detected by the photo-eye 26 of zone 5, the zone conveyor of zone 5 is actuated on. This results in the leading edge of article A5 being detected by the photo-eye of zone 4, as illustrated in FIG. 7c. At that time, the zone conveyor of zone 4 is actuated on, resulting in the leading edge of article A3 being detected by the photo-eye for zone 3, as illustrated in FIG. 7d. At that time, the zone conveyor for zone 3 is actuated on, resulting in the leading edge of article A4 being detected by the photo-eye for zone 2, as illustrated in FIG. 7e. At that time, the zone conveyor for zone 2 is actuated. When the leading edge of article A5 is detected by the photo-eye for zone 1, the zone conveyor for zone 1 is actuated. Once a zone conveyor is actuated in the discharge mode, it may remain operational thereby moving the slug along the conveying surface without introducing further gaps between the articles. The accumulated portion is discharged from the conveying surface 20, as illustrated in FIGS. 7g–7i.

If desired, the slug forming portion 19 of accumulation conveyor 18 may enter the accumulation mode concurrently with forming a slug portion during the discharge mode 36. This is illustrated in FIGS. 7e–7i. In particular, as a slug portion is formed and moved forward, new articles may be accumulated on the emptied zones behind the slug portion.

The operation of accumulation mode 34 and discharge mode 36 may be accomplished by cycling each zone conveyor on and off only once per accumulation cycle. In particular, the zone conveyors may be operated until an article reaches that zone, at which time the zone conveyor is deactuated. Once the slug is formed and reaches that zone conveyor, that zone conveyor is again actuated on to move the slug forward. However, each zone conveyor only needs to be actuated and deactuated once. This reduction in cycling of the zone conveyor facilitates the use of motorized rollers in zone conveyors by minimizing the amount of heat generated by over-cycling of the zone conveyor.

If desired, the zone conveyors of conveying surface 20 may be actuated at a common speed during both the accumulation mode and the discharge mode. Alternatively, the zone conveyors making up the conveying surface may be operated at one speed during the accumulation mode and at a second, higher, speed during a discharge mode, according to the principles disclosed in commonly assigned U.S. patent application Ser. No. 10/065,789, filed by Ted W. Haan, on Nov. 19, 2002, entitled HIGH VOLUME CONVEYOR SORTATION SYSTEM, the disclosure of which is hereby incorporated herein by reference.

Thus, it is seen that slug forming portion 19 provides a reverse-slug-accumulation capability that is controlled using a series of zone-controlled accumulating conveyor sections and article sensors. Although the slug forming is illustrated with six zones of accumulation in the system, it will be understood that a fewer or greater number of zones may be provided. The accumulation zones are monitored by photo-eyes that will shut down the motor of a section as an article clears the photo-eye at the entrance of the zone. An induct photo-eye 40 may be provided to detect the number of containers inducted into the accumulation conveyors, as well as measure the length of each inducted articles. Articles are inducted into the system utilizing gapping between the articles. The first article inducted into the system will travel across the gap-adjusting conveyor, pass through the photo-eye associated with zone 6, and continue toward zone 1, which is furthest from the gap-adjusting conveyor. When the trailing edge of the container is identified by the photo-eye at zone 1, the section of the conveyor is stopped. The system will continue to induct articles until photo-eye 40 has counted six articles into the system and there is an article present at each of the zones. If the induct photo-eye identifies an article that is larger than a single zone, the photo-eye will increment the container count by a number of times equal to the number of zones required by the length of the article.

Once all zones 1–6 are filled, the system will change the logic by which articles are inducted and begins to build a slug portion. The motor for zone 6 will turn on, allowing the article to accumulate head-to-tail with the article in zone 5. After the photo-eye at zone 5 becomes blocked, the motor for zone 5 will turn on allowing the article from zones 6 and 5 to accumulate with the article in zone 4. This will continue until all six articles have accumulated into a slug of six articles with the head of the slug at zone 1. As zones become cleared out of articles, the system may continue to send articles across the gap-adjusting conveyor to occupy the empty zones.

When all articles have accumulated into a full slug, the head of the article at zone 1 will block an article present photo-eye 42. This will signal the control of the system that the slug portion is ready to be released. Release may occur immediately or may be delayed, if necessary, in order to sequence the output of the slug portion to slug combining section 19. The delay may occur before or after the slug portion is formed. During the release of the accumulated slug portion, the zones occupied by the current slug portion will activate sequentially or simultaneously, releasing the slug portion downstream to the slug combining section and allowing the next round of articles to occupy the zones. Once the accumulated slug portion has been completely released and all zones have been rebuilt, the discharge cycle may be repeated. As a slug portion is released to slug combining section 19, it is combined with prior slug portions already on conveying surface 29. This is accomplished by indexing conveying surface 19 at the same rate the slug portion is released from the slug-building portion. Once an article sensor 26 senses that a complete slug S has been formed, the slug is released to transport conveyor 12 where it is transported to terminal end 15 for discharge or accumulation with other slugs.

In an alternative embodiment, an accumulating conveyor system 110 has an accumulation assembly 118 with a slug-combining portion 119, which is capable of accumulating more than one article in each zone (FIGS. 8–9b). A gap-adjusting conveyor 128 provides a speed increase to the articles, which are measured at a photo-eye 40a for gap length. In the illustrative embodiment, a 30 percent speed increase is provided. As illustrated in FIG. 6b, articles having gaps below a minimum length, such as 1.5 inches, are logically attached together and assigned together to the last available zone. Articles that are greater than the minimum value, but less than a maximum value, are compressed at gap-adjusting conveyor 128 and are logically attached together and assigned together to the last available zone. Articles having gaps of greater than the maximum value, such as 5 inches, are assigned individually to the last available zones. Thus, it is seen that feed conveyor 128 is capable of applying a speed increase to articles entering the accumulation conveyor 118, as well as adjusting the gap between the articles. An example of such a conveyor is disclosed in commonly assigned U.S. Pat. No. 5,341,916, the disclosure of which is hereby incorporated herein by reference. The articles can arrive at a photo-eye 40b and are measured for a length to determine how many zones will be required and to assign the next available zone. Any articles with less than a particular length of gap are grouped and treated as one article and assigned to a zone. Attached articles travel as one and are zoned as one. Only one zone conveyor is stopped at a time unless the article length exceeds the length for that zone and is assigned to two zones.

Conveyor system 110 includes a transfer conveyor 132 that is generally of a sufficient length to hold an entire slug S. Transfer conveyor 132 may also be sequenced with the transfer conveyor of other lines in order to coordinate arrival of slugs at the merge. Transfer conveyor 132 may hold a slug for a limited period, then release the slug at an appropriate time under the control of a system controller. Alternatively, transfer conveyor 132 may discharge the slug to a transport line (not shown in FIGS. 8–9b). Total slug length on transport conveyor 132 is measured and/or computed. An intermediate zone A is provided downstream of zone 1. The presence of zone A downstream of zone 1 ensures that the upstream zones will be able to compress into a slug before going onto transport conveyor 132. The first article or articles of each cycle attaches to the end of the previously released slug and stops when the previous article stops. The combined length of the first article plus the trailing gap length in comparsion to the zone length determines the assigned zone, which must be assigned to the next available zone. If the first article is of less than a particular length, it is assigned to zone A. If it is longer, it is assigned to zones 1, 2 or 3, depending on the length. Articles attached to zones travel to the appropriate zone and stop with the upstream edge of the article aligned with the upstream end of the zone. Articles are assigned to zones until all available zones are full of if the first article arrives at the assigned zone. That will signal the end of that cycle, and the next article not assigned to a zone becomes the last article of that cycle and continues to run an activate the downstream zones. If there are zones with attachment of another article, the whole attachment is regarded as one article and is treated as one article, regardless of location. The article after the last article of the previously released slug becomes the first article of the next cycle and is assigned to the last zone.

Changes and modifications in the specifically described embodiments can be carried out without departing from the principles of the invention which is intended to be limited only by the scope of the appended claims, as interpreted according to the principles of patent law, including the Doctrine of Equivalents.

What is claimed is:

1. An accumulation conveyor system, comprising:
   an accumulation assembly adapted to accumulating a plurality of articles into a slug of articles, the slug of articles having a nominal length;
   a transport line comprising a plurality of tandem transport conveyors downstream of said accumulation assembly; and
   a control for said accumulation assembly and said transport line, said control discharging individual slugs from said accumulation assembly and transporting the slugs from said accumulation assembly with said transport conveyors, said control monitoring slugs at said transport conveyors and accumulating slugs with said transport conveyors;
   wherein said transport conveyors have lengths that are generally no longer than said nominal length.

2. The accumulation conveyor system of claim 1 wherein said transport conveyors have lengths substantially equal to said nominal length.

3. The accumulation conveyor system of claim 1 wherein said accumulation assembly accumulates articles with gaps between the articles.

4. The accumulation conveyor system of claim 1 wherein said accumulation assembly accumulates articles substantially without gaps between the articles.

5. The accumulation conveyor system of claim 1 wherein said accumulation assembly comprises a plurality of conveying sections defining tandem accumulation zones and wherein said control operates said conveying sections to accumulate articles in said zones and form a slug by reducing gaps between articles in sequence from upstream gaps to downstream gaps.

6. The accumulation conveyor system of claim 1 wherein said control accumulates slugs at the transport line from downstream transport conveyors to upstream transport conveyors.

7. The accumulation conveyor system of claim 6 wherein said transport conveyors accumulated slugs at a first speed and discharge accumulated slugs at a second speed that is higher than said first speed.

8. The accumulation conveyor system of claim 1 wherein said accumulation assembly comprises a slug forming section and a slug combining section, said slug forming section forms slug portions and discharges slug portions to said slug combining section, said slug combing section combines slug portions into slugs.

9. The accumulation conveyor system of claim 8 wherein said slug accumulation section comprises a plurality of conveying sections defining tandem accumulation zones and wherein said control operates said conveying sections to accumulate articles in said zones and form a slug by reducing gaps between articles in sequence from upstream gaps to downstream gaps.

10. The accumulation system of claim 1 including at least two of said accumulation assemblies and at least two of said transport lines, each downstream of a respective one of said at least two accumulation assemblies, said system further including a merge for merging slugs from said transport lines and a downstream process downstream of said merge.

11. The accumulation conveyor system of claim 10 wherein said downstream process comprises an article sortation process.

12. An accumulation conveyor apparatus, comprising:
    a conveying surface divided into a plurality of conveying sections, said conveying sections defining tandem accumulation zones;
    a control, said control monitoring articles on said conveying surface and operating said conveying sections to accumulate articles in said zones in an accumulation mode, said control operating said conveying sections after said accumulation mode with articles accumulated in said zones to form a slug by reducing gaps between articles.

13. The apparatus of claim 12 wherein said control starts and stops individual ones of said conveying sections no more than once during as accumulation cycle.

14. The apparatus of claim 12 wherein said control forms the slug concurrently with discharging articles from said conveying surface.

15. The apparatus of claim 12 including a slug combining section downstream of said conveying surface to combine slugs into larger slugs.

16. The apparatus of claim 12 further including a transport line comprising a plurality of tandem transport conveyors downstream of said accumulation assembly, wherein said control discharges individual slugs from said accumulation assembly and transports the slugs from said accumulation assembly with said transport conveyors, said control monitoring slugs at said transport conveyors and accumulates slugs with said transport conveyors.

17. The accumulation conveyor apparatus of claim 12 wherein said accumulation assembly forms a slug by reducing gaps between articles in sequence from upstream gaps to downstream gaps.

18. The accumulation conveyor apparatus of claim 12 including at least two of said conveying surfaces, said apparatus further including a merge for merging slugs from said conveying surfaces and a downstream process downstream of said merge.

19. The accumulation conveyor system of claim 18 wherein said downstream process comprises an article sortation process.

20. An accumulation conveyor apparatus, comprising:
 a conveying surface divided into a plurality of conveying sections, said conveying sections defining tandem accumulation zones;
 a control, said control monitoring articles on said conveying surface and operating said conveying sections to accumulate articles in said zones, said control operating said conveying sections to form a slug by reducing gaps between articles in sequence from upstream gaps to downstream gaps.

21. The apparatus of claim 20 wherein said control starts and stops individual ones of said conveying sections no more than once during an accumulation cycle.

22. The apparatus of claim 20 wherein said control forms said slug concurrently with discharging articles from said conveying surface.

23. The apparatus of claim 20 including a slug combining section downstream of said conveying surface to combine slugs into larger slugs.

24. The apparatus of claim 20 further including a transport line comprising a plurality of tandem transport conveyors downstream of said accumulation assembly, wherein said control discharges individual slugs from said accumulation assembly and transports the slugs from said accumulation assembly with said transport conveyors, said control monitoring slugs at said transport conveyors and accumulates slugs with said transport conveyors.

25. The apparatus of claim 20 including at least two of said conveying surfaces, said apparatus further including a merge for merging slugs from said conveying surfaces and a downstream process downstream of said merge.

26. The accumulation conveyor system of claim 25 wherein said downstream process comprises an article sortation process.

27. An accumulation conveyor apparatus, comprising:
 a conveying surface divided into a plurality of conveying sections, said conveying sections defining tandem accumulation zones;
 article sensors associated with said conveying sections and wherein said article sensors are positioned at interfaces of said conveying sections;
 a control, said control monitoring articles on said conveying surface and operating said conveying sections to accumulate articles in said zones by terminating operation of a conveying section when the associated article sensor senses a trailing portion of an article at that conveying section;
 said control operating said conveying sections with articles accumulated in said zones to form a slug by reducing gaps between articles.

28. The apparatus of claim 27 wherein said control operates said conveying sections to discharge articles by initiating operation of a conveying section when an associated article sensor senses a leading portion of an article upstream of that conveying section.

29. The apparatus of claim 27 wherein said control operates said conveying sections during a discharge mode by initiating operation of a conveying section when an associated article sensor senses a leading portion of an article upstream of that conveying section.

30. The apparatus of claim 27 wherein said control discharges articles in said discharge mode with gaps between the articles.

31. The apparatus of claim 27 including a slug combining section downstream of said conveying surface to combine slugs into larger slugs.

32. The apparatus of claim 27 further including a transport line comprising a plurality of tandem transport conveyors downstream of said accumulation assembly, wherein said control discharges individual slugs from said accumulation assembly and transport the slugs from said accumulation assembly with said transport conveyors, said control monitoring slugs at said transport conveyors and accumulates slugs with said transport conveyors.

33. The accumulation conveyor apparatus of claim 27 wherein said accumulation assembly forms a slug by reducing gaps between articles in sequence from upstream gaps to downstream gaps.

34. The accumulation conveyor apparatus of claim 27 including at least two of said conveying surfaces, said apparatus further including a merge for merging slugs from said conveying surfaces and a downstream process downstream of said merge.

35. The accumulation conveyor system of claim 34 wherein said downstream process comprises an article sortation process.

36. A method of accumulating articles, comprising:
 providing an accumulation assembly and accumulating a plurality of articles with said accumulation assembly into a slug of articles, the slug of articles having a nominal length;
 providing a transport line comprising a plurality of tandem transport conveyors downstream of said accumulation assembly wherein said transport conveyors have lengths that are generally no longer than said nominal lengths;
 discharging individual slugs from said accumulation assembly and transporting the slugs from said accumulation assembly with said transport conveyors, including monitoring slugs at said transport conveyors and accumulating slugs with said transport conveyors.

37. A method of accumulating articles, comprising:
 a) providing a conveying surface divided into a plurality of conveying sections, said conveying sections defining tandem accumulation zones;
 b) operating said conveying sections to accumulate articles in said zones;
 c) operating said conveying sections after step b with articles accumulated in said zones thereby forming a slug by reducing gaps between articles.

38. A method of accumulating articles, comprising:
 providing a conveying surface divided into a plurality of conveying sections, said conveying sections defining tandem accumulation zones;
 monitoring articles on said conveying surface and operating said conveying sections to accumulate articles in said zones;
 forming a slug by reducing gaps between articles in sequence from upstream gaps to downstream gaps.

39. A method of accumulating articles, comprising:
 providing a conveying surface divided into a plurality of conveying sections, said conveying sections defining tandem accumulation zones;

sensing articles at interfaces of said conveying sections;

operating said conveying sections to accumulate articles in said zones;

operating said conveying sections with articles accumulated in said zones thereby forming a slug by reducing gaps between articles;

said operating said conveying sections to accumulate articles comprises terminating operation of a conveying section when a trailing portion of an article is sensed at that conveying section.

* * * * *

UNITED STATES PATENT AND TRADEMARK OFFICE
CERTIFICATE OF CORRECTION

PATENT NO.        : 7,063,206 B2
APPLICATION NO.   : 10/605277
DATED             : June 20, 2006
INVENTOR(S)       : Ted W. Haan and Wynn M. Pelak It is certified that error appears in the above-identified patent and that said Letters Patent is hereby corrected as shown below:

Column 1:
Line 4, "Applications" should be --Application--.
Line 34, Insert --a-- before "sortation".
Line 38, "discharges" should be --discharged--.

Column 2:
Line 12, "bases" should be --based--.

Column 3:
Line 10, "accumulated" should be --accumulate--.
Line 33, "from" should be --with--.
Line 45, "accumulated" should be --accumulate--.

Column 5:
Line 67, Insert --,-- after "length".
Line 67, "of slug forming" should be --but may be of a greater or lesser--.

Column 6:
Line 1, Delete "section 19, in the".
Line 18, Insert --combining section 21. Thus, each slug may move from the-- after "slug".

Column 9:
Line 27, "comparsion" should be --comparison--.
Line 35, "of" should be --or--.
Line 38, "are" should be --and--.

Column 10:
Line 19, Claim 7, "accumulated" should be --accumulate--.
Line 35, Claim 10, Insert --conveyor-- after "accumulation".
Line 57, Claim 13, "as" should be --an--.

UNITED STATES PATENT AND TRADEMARK OFFICE
CERTIFICATE OF CORRECTION

PATENT NO. : 7,063,206 B2
APPLICATION NO. : 10/605277
DATED : June 20, 2006
INVENTOR(S) : Ted W. Haan and Wynn M. Pelak It is certified that error appears in the above-identified patent and that said Letters Patent is hereby corrected as shown below:

<u>Column 12:</u>
Line 16, Claim 32, "transport" should be --transports--.

Signed and Sealed this

Thirteenth Day of February, 2007

JON W. DUDAS
*Director of the United States Patent and Trademark Office*